United States Patent
Audhkhasi et al.

(10) Patent No.: US 10,839,792 B2
(45) Date of Patent: Nov. 17, 2020

(54) RECOGNITION OF OUT-OF-VOCABULARY IN DIRECT ACOUSTICS-TO-WORD SPEECH RECOGNITION USING ACOUSTIC WORD EMBEDDING

(71) Applicants: International Business Machines Corporation, Armonk, NY (US); Toyota Technological Institute at Chicago, Chicago, IL (US)

(72) Inventors: Kartik Audhkhasi, White Plains, NY (US); Karen Livescu, Yorktown Heights, NY (US); Michael Picheny, White Plains, NY (US); Shane Settle, Yorktown Heights, NY (US)

(73) Assignees: INTERNATIONAL BUSINESS MACHINES CORPORATION, Armonk, NY (US); TOYOTA TECHNOLOGICAL INSTITUTE AT CHICAGO, Chicago, IL (US)

( * ) Notice: Subject to any disclaimer, the term of this patent is extended or adjusted under 35 U.S.C. 154(b) by 127 days.

(21) Appl. No.: 16/267,489

(22) Filed: Feb. 5, 2019

(65) Prior Publication Data
US 2020/0251096 A1 Aug. 6, 2020

(51) Int. Cl.
*G10L 15/16* (2006.01)
*G10L 15/06* (2013.01)
(Continued)

(52) U.S. Cl.
CPC .............. *G10L 15/16* (2013.01); *G06N 3/08* (2013.01); *G10L 15/063* (2013.01); *G10L 15/19* (2013.01);
(Continued)

(58) Field of Classification Search
CPC ....... G10L 15/16; G10L 15/063; G10L 25/30; G06N 3/084; G06F 40/237
(Continued)

(56) References Cited

U.S. PATENT DOCUMENTS 7,590,533 B2  9/2009 Hwang
7,890,325 B2  2/2011 Liu et al.
(Continued)

OTHER PUBLICATIONS

Mel, et al. "The NIST Definition of Cloud Computing". Recommendations of the National Institute of Standards and Technology. Nov. 16, 2015.
(Continued)

*Primary Examiner* — Susan I McFadden
(74) *Attorney, Agent, or Firm* — Anthony R. Curro, Esq.; McGinn IP Law Group, PLLC

(57) ABSTRACT

A method (and structure and computer product) for learning Out-of-Vocabulary (OOV) words in an Automatic Speech Recognition (ASR) system includes using an Acoustic Word Embedding Recurrent Neural Network (AWE RNN) to receive a character sequence for a new OOV word for the ASR system, the RNN providing an Acoustic Word Embedding (AWE) vector as an output thereof. The AWE vector output from the AWE RNN is provided as an input into an Acoustic Word Embedding-to-Acoustic-to-Word Neural Network (AWE→A2W NN) trained to provide an OOV word weight value from the AWE vector. The OOV word weight is inserted into a listing of Acoustic-to-Word (A2W) word embeddings used by the ASR system to output recognized words from an input of speech acoustic features, wherein the OOV word weight is inserted into the A2W word embeddings list relative to existing weights in the A2W word embeddings list.

25 Claims, 5 Drawing Sheets

(51) Int. Cl.
*G06N 3/08* (2006.01)
*G10L 15/19* (2013.01)
*G10L 15/08* (2006.01)

(52) U.S. Cl.
CPC ............... *G10L 2015/0635* (2013.01); *G10L 2015/088* (2013.01)

(58) Field of Classification Search
USPC ....................................................... 704/232
See application file for complete search history.

(56) References Cited

U.S. PATENT DOCUMENTS

| | | | |
|---|---|---|---|
| 8,688,451 B2 | 4/2014 | Grost et al. | |
| 9,153,231 B1 | 10/2015 | Salvador et al. | |
| 10,019,438 B2 * | 7/2018 | Audhkhasi | G06F 40/40 |
| 10,095,684 B2 * | 10/2018 | Willson | G06F 40/274 |
| 10,380,997 B1 | 8/2019 | Ward | G06K 9/4628 |
| 10,431,210 B1 * | 10/2019 | Huang | G06N 3/0445 |
| 10,540,959 B1 * | 1/2020 | Ward | G10L 15/063 |
| 10,629,193 B2 * | 4/2020 | Ye | G10L 15/187 |
| 10,692,488 B2 * | 6/2020 | Huang | G06N 7/005 |
| 10,720,151 B2 * | 7/2020 | Sypniewski | G06N 3/084 |
| 2016/0163310 A1 | 6/2016 | Lee et al. | |
| 2017/0372696 A1 | 12/2017 | Lee | |
| 2018/0061397 A1 | 3/2018 | Huang et al. | |
| 2020/0074983 A1 * | 3/2020 | Yu | G10L 15/16 |

OTHER PUBLICATIONS

J. Li, et al. "Advancing Acoustic to Word CTC Model", Proc. ICASSP, 2018.

Li, et al. "Acoustic-to-Word Model Without OOV", Proc. ASRU, 2017.

Audhkhasi et al, "Building competitive direct acoustics-to-word models for English conversational speech recognition", Proc. ICASSP, 2018.

International Search Report dated May 12, 2020 in PCT co-pending Application No. PCT/IB2020/050834.

* cited by examiner

RECOGNITION OF OUT-OF-VOCABULARY IN DIRECT ACOUSTICS-TO-WORD SPEECH RECOGNITION USING ACOUSTIC WORD EMBEDDING

BACKGROUND

The present invention relates generally to direct acoustics-to-word (A2W) automatic speech recognition (ASR). More specifically, an Acoustic Word Embedding Recurrent Neural Network (AWE RNN) develops an AWE vector from a character sequence of a new Out-of-Vocabulary (OOV) word entered by a user as a mechanism for an ASR system to be able to recognize new OOV words without additional training or using an externally-trained language model.

SUMMARY

Direct acoustics-to-word (A2W) automatic speech recognitions (ASR) systems use a neural network to directly recognize words from an input speech utterance without using any external decoder or language model. However, A2W ASR systems are trained with a fixed vocabulary, referred to as in-vocabulary (IV) words, and cannot easily recognize out-of-vocabulary (OOV) words. The present invention permits a user to enter a new OOV word as a character sequence into an A2W ASR system to permit the OOV word to be added into the listing of A2W word embeddings so that the ASR can directly recognize OOV words from speech acoustic features easily at test time without any further training.

According to an exemplary embodiment, the present invention describes a method for learning Out-of-Vocabulary (OOV) words in an Automatic Speech Recognition (ASR) system, the method including: using an Acoustic Word Embedding Recurrent Neural Network (AWE RNN) to receive a character sequence for a new OOV word for the ASR system, the RNN providing an Acoustic Word Embedding (AWE) vector as an output thereof; providing the AWE vector output from the AWE RNN as an input into an Acoustic Word Embedding-to-Acoustic-to-Word Neural Network (AWE→A2W NN) trained to provide an OOV word weight value from the AWE vector; and inserting the OOV word weight into a listing of Acoustic-to-Word (A2W) word embeddings used by the ASR system to output recognized words from an input of speech acoustic features, wherein the OOV word weight is inserted into the A2W word embeddings list relative to existing weights in the A2W word embeddings list.

In another exemplary aspect, also described herein is a method for Automatic Speech Recognition (ASR), including: receiving a character sequence for an Out-of-Vocabulary (OOV) word into an Acoustic Word Embedding Recurrent Neural Network (AWE RNN) of an ASR system, as a mechanism to receive a character sequence for a new OOV word for the ASR system, the AWE RNN providing an Acoustic Word Embedding (AWE) vector as an output thereof; providing the AWE vector output from the AWE RNN as an input into an Acoustic Word Embedding-to-Acoustic-to-Word Neural Network (AWE→A2W NN) trained to provide an OOV word weight value from the AWE vector; and inserting the OOV word weight into a listing of Acoustic-to-Word (A2W) word embeddings used by the ASR system to output recognized words from an input of speech acoustic features, wherein the OOV word weight is inserted into the A2W word embeddings list relative to existing weights in the A2W word embeddings list.

In another exemplary aspect, also described herein is a method for Automatic Speech Recognition (ASR), including: initially training an overall subnetwork comprising an Acoustic-to-Word Recurrent Neural Network (A2W RNN), the A2W RNN receiving In-Vocabulary (IV) words for the initial training, the initial training using IV words resulting in a listing of Acoustic-to-Word (A2W) Word Embeddings stored in a memory of an ASR system performing the ASR processing; receiving an Out-of-Vocabulary (OOV) word as a character sequence into an Acoustic Word Embedding Recurrent Neural Network (AWE RNN), as a mechanism to receive a character sequence for a new OOV word for the ASR system, the AWE RNN providing an Acoustic Word Embedding (AWE) vector as an output thereof; providing the AWE vector output from the AWE RNN as an input into an Acoustic Word Embedding-to-Acoustic-to-Word Neural Network (AWE→A2W NN) trained to provide an OOV word weight value from the AWE vector; and inserting the OOV word weight into a listing of Acoustic-to-Word (A2W) word embeddings used by the ASR system to output recognized words from an input of speech acoustic features, wherein the OOV word weight is inserted into the A2W word embeddings list relative to existing weights in the A2W word embeddings list.

In another exemplary aspect, also described herein is a method for training an Automatic Speech Recognition (ASR) system, including: receiving an acoustic sequence for each In-Vocabulary (IV) word used to initially train the ASR system; concurrently receiving a word sequence corresponding to each IV word; and preparing a listing of Acoustic-to-Word (A2W) Word Embeddings of the IV words, wherein the initial training uses a discriminative loss function, the discriminative loss function forcing, for each IV word in the listing of A2W word embeddings, the acoustic embedding for that IV word to be close to its text embedding in the listing.

In yet another exemplary aspect, also described herein is an Automatic Speech Recognition (ASR) system, including: a processor in a computer system; and one or more memory devices accessible to the processor, wherein at least one memory of the at least one memory device of the one or more memory devices stores a set of machine-readable instructions to configure the computer system to function as the ASR system, the ASR system comprising an Acoustics-to-Word Recurrent Neural Network (A2W RNN), as implemented by a processor on a computer system, the A2W RNN configured to receive speech acoustic features of words to be automatically recognized, the A2W RNN providing an acoustic embedding of the speech acoustic features of input words; and an Acoustic-to-Word (A2W) Word Embeddings list storing a listing of recognized words, wherein the ASR is configured to select a word from the A2W Word Embeddings list for output of the ASR as a recognized word by selecting a word from the A2W Word Embedding list that most closely matches an output acoustic embedding of the A2W RNN for input speech acoustic features, and wherein the ASR is initially trained by: receiving an acoustic sequence for each In-Vocabulary (IV) word used to initially train the ASR system; concurrently receiving a word sequence corresponding to each IV word; and preparing a listing of Acoustic-to-Word (A2W) word embeddings of the IV words, wherein the initial training uses a discriminative loss function, the discriminative loss function forcing, for each IV word in the listing of A2W word embeddings, the acoustic embedding for that IV word to be close to its text embedding in the listing.

DETAILED DESCRIPTION

In-Vocabulary (IV) words are words used as input data to train a neural network (NN) in an Automatic Speech Recognition (ASR) system, the training providing settings for parameters of one or more layers of the neural network, using a backpropagation mechanism. Out-of-Vocabulary (OOV) words are therefore words that are received by the ASR system subsequent to the training of the NN, so that OOV words are not necessarily readily recognized by the previous training of the ASR NN. Several current approaches related to handling OOV words in direct acoustics-to-word (A2W) ASR systems are described as follows.

For example, several conventional systems train an acoustics-to-subword (A2S) model instead of an A2W model. These subwords include characters and word fragments/pieces. Predicting such subword units makes the ASR system open-vocabulary and hence enables it to recognize OOV words. However, such subword ASR systems still use a decoder and externally-trained language model to perform well, which is much more complex than recognizing speech with an A2W system.

The spell-and-recognize (SAR) model, another approach to ASR, trains an A2W system to first spell a word and then recognize it. For example, given the word sequence "THE CAT IS BLACK", the SAR system is trained to predict "THE" as _THE_, "CAT" as _CAT_, "IS" as _IS_, and "BLACK" as _BLACK_, where "_" denotes the space character. At test time, wherever the system predicts an <OOV> word token, the system backs off to the previously predicted character sequence. The main limitation of this approach is that OOV words are often incorrectly recognized due to spelling errors.

Another method proposes an extension of the SAR model by sharing neural network hidden layers for a word and character ASR model. Whenever an <OOV> word token is emitted, the system backs off to character predictions. Yet another proposed method decomposes OOV words into sub-word units and known words during training. This model also suffers from the limitations of the subword-based model first mentioned above.

These conventional methods in recognizing OOV words in an A2W ASR system thus have drawbacks, including a key drawback of dependence on an external language model and decoder to perform well. This is because greedy "decoder-less" speech recognition using a subword-based model is not guaranteed to produce correct words.

Figure 1:
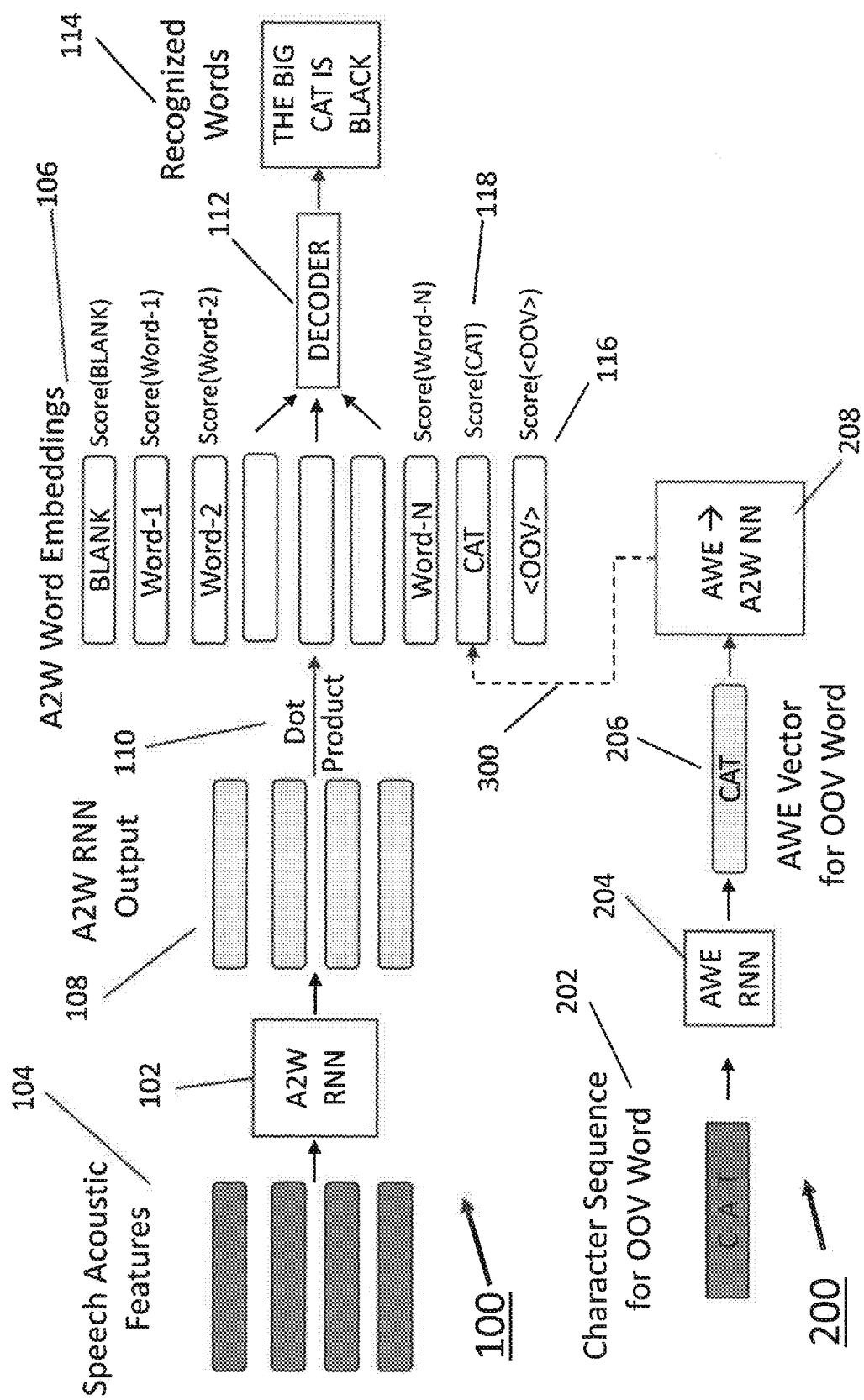
FIG. 1 shows an exemplary embodiment of the present invention as incorporating an additional AWE subnetwork for permitting OOV words to be incorporated into word embeddings of IV words originally used to train the ASR system.

FIG. 1 shows an exemplary embodiment of the present invention, in which there is an upper subnetwork 100 and lower subnetwork 200. In summary and in contrast to these conventional methods described above, the present invention discloses to incorporate a novel, lower subnetwork 200 that permits a user-entered OOV word to be entered into the A2W Word Embeddings list 106 as a new OOV without the additional training or language model required in conventional ASRs.

This subnetwork 200 is initially trained using IV words, similar to initial training of the top subnetwork 100 using IV words. After initial training the lower subnetwork 200 permits a user to enter an OOV word character sequence 202 as an input into AWE RNN 204, which provides an AWE vector 206 as an output.

The AWE vector 206 then transformed into a weight vector by the AWE→A2W Neural Network (AWE→A2W NN) 208, which weight vector 208 is similar in nature to weights derived for IV words during initial training of the upper subnetwork 100 to develop the A2W Word Embeddings list 106 in the initial training of the upper subnetwork 100, so that the new OOV word weight can then be used to appropriately place a newly-entered OOV word into the A2W Word Embeddings list 106. The AWE→A2W NN 208 is also initially trained using IV words, and permits the weight vector connecting the OOV word unit to be appropriately set into the output layer of the A2W ASR model to the previous layer (dotted line 300 in FIG. 1) as corresponding to the OOV word CAT 118 rather than an <OOV> token 116. This mechanism enables the A2W ASR system to then directly recognize an OOV word without needing any external decoder or language model, by a user entering the character sequence of an OOV word into the lower subnetwork 200 along with an acoustic utterance containing the OOV word in the upper subnetwork 100.

A key advantage of this invention over prior methods dealing with OOV word recognition is that it does not rely on subword units and instead directly predicts both IV words and OOV words. The prior methods using subword units require the use of a decoder and external language model, and such requirement takes away from the simplicity and decoding speed of an A2W model.

Once the ASR system has been trained using IV words, as described below, along with any OOV words subsequently entered by a user, the upper subnetwork 100 can then receive speech acoustic features 104 during normal ASR operation, in which recognized words 114 are provided as an output via decoder 112, as based on matching the input speech acoustic features 104, as the output 108 from the A2W RNN 102, with the N words in the A2W Word Embeddings listing 106, using, for example, a comparison technique such as dot product 110.

Figure 2:
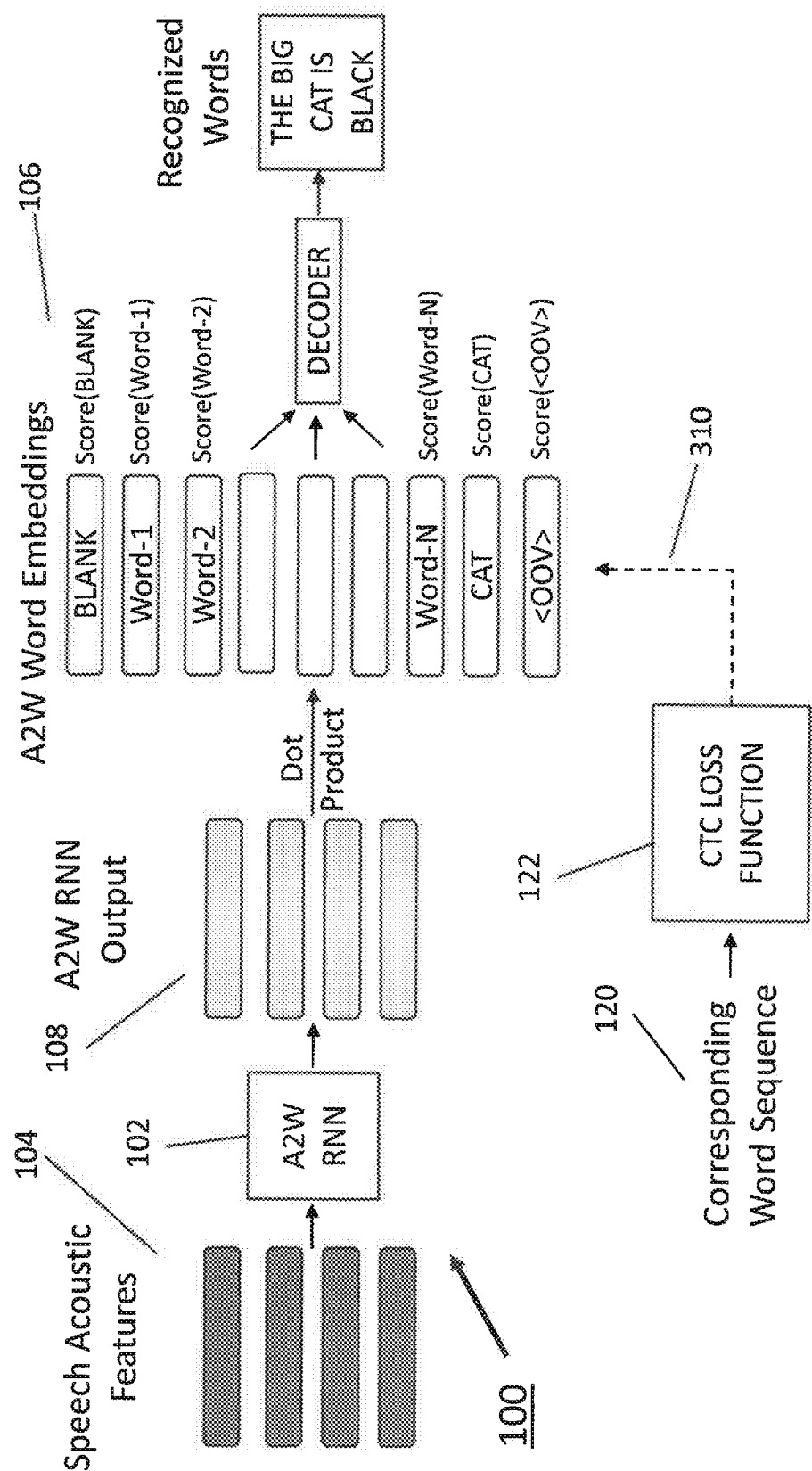
FIG. 2 shows initial training of the baseline A2W ASR model.

FIG. 2 shows the upper A2W subnetwork 100 as a baseline acoustics-to-word (A2W) automatic speech recognition (ASR) model, which is initially trained by presenting A2W RNN and the final A2W embeddings (i.e., the entire network) with speech acoustic features 104 and corresponding word sequences 120. It is noted that, in the context of explaining the present invention, that "word sequences" are not the same as "character sequences". For example, a word sequence is "THE CAT IS BLACK" and the corresponding character sequence is "T H E C A T I S B L A C K". These word sequences are not input into any separate RNN, but are only used during a "connectionist temporal classification (CTC)" loss function 122 shown in FIG. 2, use for comparing/correlating the predictions of the A2W network with the correct word sequence. Backpropagation is used to update the entire network's weights in order to minimize this loss function, thereby providing the weights to the AWE RNN 102 achieved during initial training using IV words. At this stage, all out-of-vocabulary (OOV) words in the training word sequences in the A2W Word Embedding listing 106 are replaced by the <OOV> token.

Thus, this initial training uses a discriminative loss function, such as the constructive loss function 122, to force the acoustic 104 and text 120 embeddings to be close in the A2W Word Embeddings list 106 when they correspond to the same word and far apart when they correspond to different words. At the convergence of this training, the text 120 embedding is highly correlated to the acoustic 104 embedding of the same IV word in the A2W Word Embeddings 106. Because of this mechanism of providing a high correlation between acoustic and text embeddings in the A2W Word Embeddings 106 for the same word, the present invention will be able to insert OOV words into the A2W Word Embeddings 106 using an input character sequence 202 and the lower subnetwork 200 which is initially trained to provide a weight associated with character sequences of OOV words entered by a user.

It is further noted that, because sequences are used as the input formats into both the upper subnetwork 100 and the lower subnetwork 200, the initial neural networks of both subnetworks 100, 200 are recurrent neural networks (RRNs), since RNNs are a type of deep neural networks that apply a same set of weights recursively over a structure to provide a structured prediction over a variable-length input by a given structure in topological order.

Figure 3:
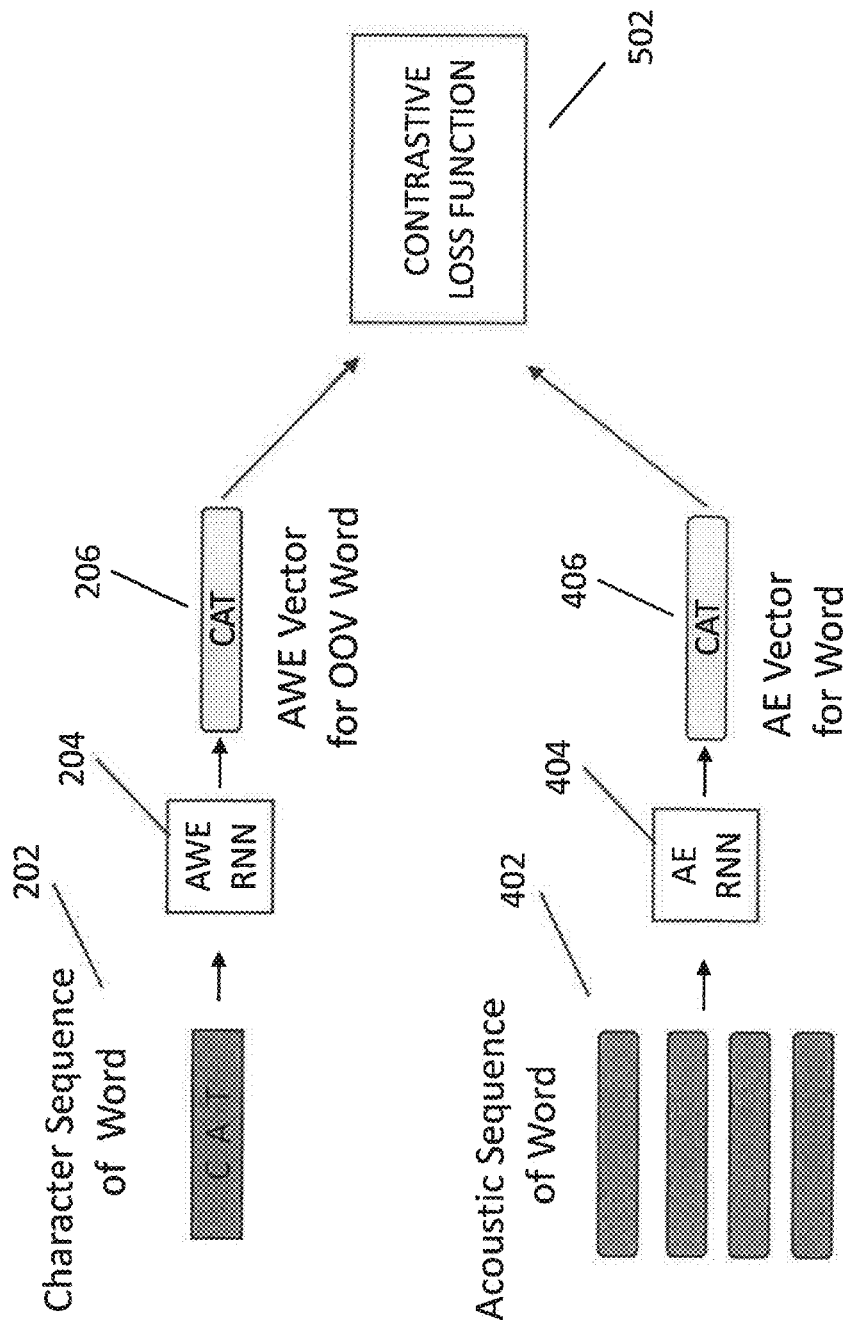
FIG. 3 shows initial training of the AWE RNN 204.

FIG. 3 shows how training proceeds for the lower subnetwork 200 of FIG. 1. During this training, two RNNs—the AWE RNN 204 (also shown in FIG. 1) and an additional RNN, the Acoustic Embedding (AE) RNN 404 are being trained. The AWE RNN 204 receives the character sequence 202 of an IV word as input while the AE RNN 204 receives the corresponding acoustic sequence 402 of the IV word. The two RNNs 204, 404 compute one embedding vector each, that are passed into the contrastive loss (error) function 502. The backpropagation algorithm is used to train the entire network's weights to minimize this loss function. Once initially trained, the AE RNN 404 can be discarded, with only the AWE RNN 204 being then used for introducing new OOV words, as shown in FIG. 1.

Thus, the lower subnetwork 200 in FIG. 1 defines a key aspect of the present invention in that this subnetwork 200 permits a user to type a character sequence 202, such as C A T, along with entering its speech acoustic features 202 in the upper subnetwork 100, as a new OOV word not currently in the A2W Word Embeddings listing 106 as a text embedding. The lower subnetwork permits the new OOV word to be appropriately placed into the Acoustic Word Embeddings 106 using the weight factor calculated in the lower network.

The present invention therefore also trains a deep neural network (e.g., the AWE→A2W NN) 208 that, once trained, takes a vector 206 in the AWE space 200 and produces an output vector in the space of weight vectors of the output linear layer 106 of the A2W model 100 (see dotted line 300 in FIG. 1). The AWE→A2W NN 208 is trained on A2W and AWE embeddings of IV words that are known during training.

Therefore, given an OOV word, entered as a character sequence 202 and an acoustic utterance containing the OOV word by a user, the present invention uses the trained AWE network 204 to produce an acoustic embedding 206 from the character sequence 202 of the OOV word. This OOV AWE vector 206 is then mapped to the A2W space (i.e., subnetwork 100) using the AWE→A2W NN 208. The output vector of this neural network 208 is used as the weight vector connecting the new output unit for the OOV word to the previous layer in the A2W model, so that the OOV word CAT will now have its own A2W Word Embedding 118.

In order to recognize the newly-entered OOV word (e.g., CAT) in an input speech utterance 104, the invention first picks the highest scoring word among the IV word list 106 and the <OOV> symbol 116. If the <OOV> symbol 116 is predicted, the invention picks the highest scoring word from OOV units, so that the new OOV "CAT" is entered into the Word Embeddings list 106 in replacement of the <OOV> token with the highest score.

System Implementation

The present invention can be implemented in a number of various computer implementations, including implementations involving a cloud service. Therefore, although this disclosure includes a detailed description on cloud computing, as follows, one having ordinary skill would understand that implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
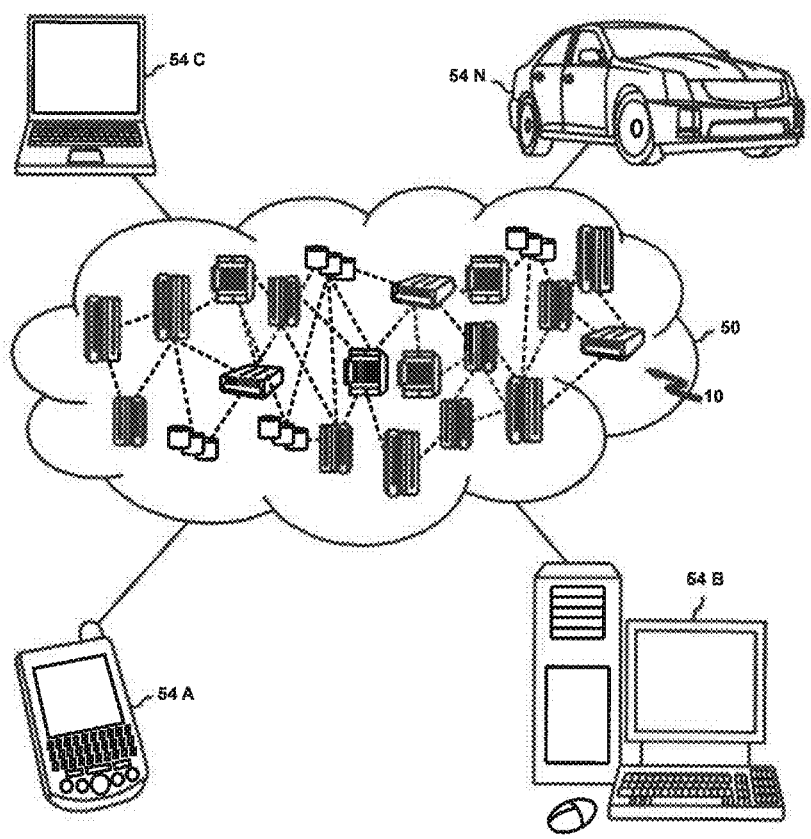
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
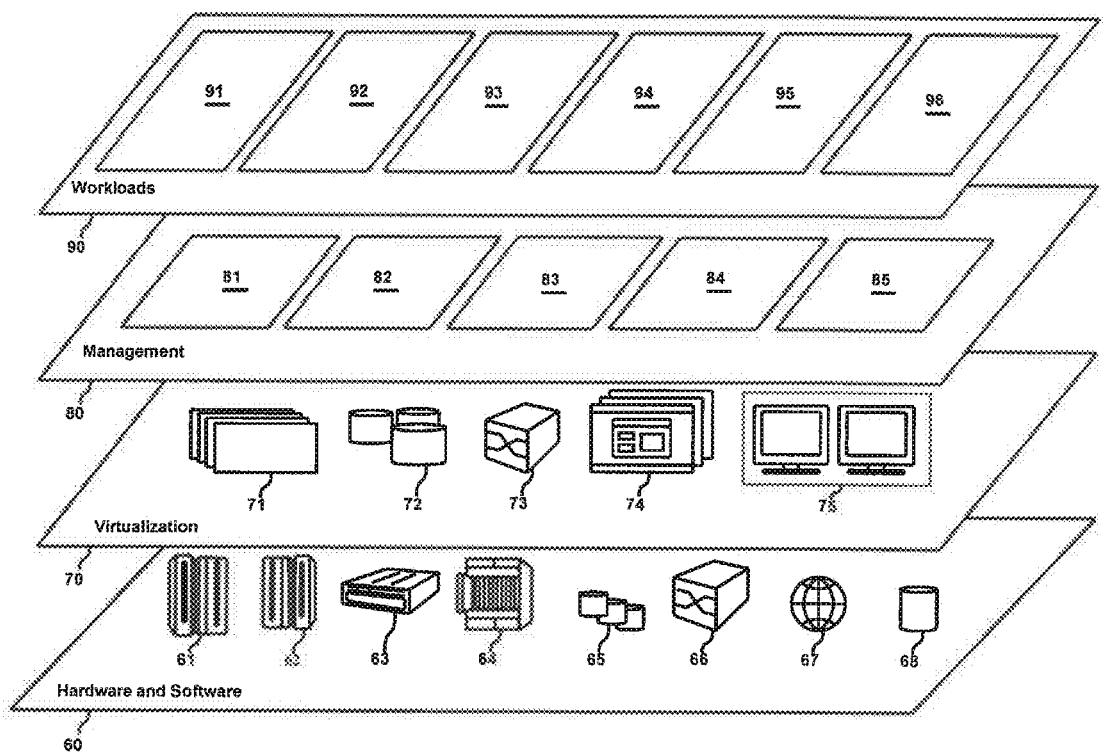
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include tasks related to the implementation of the present invention in which FOPE is incorporated, for example, into a DBaaS-based cloud service.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method for learning Out-of-Vocabulary (OOV) words in an Automatic Speech Recognition (ASR) system, the method comprising:
   using an Acoustic Word Embedding Recurrent Neural Network (AWE RNN) to receive a character sequence for a new OOV word for the ASR system, the RNN providing an Acoustic Word Embedding (AWE) vector as an output thereof;
   providing the AWE vector output from the AWE RNN as an input into an Acoustic Word Embedding-to-Acoustic-to-Word Neural Network (AWE→A2W NN) trained to provide an OOV word weight value from the AWE vector; and
   inserting the OOV word weight into a listing of Acoustic-to-Word (A2W) word embeddings used by the ASR system to output recognized words from an input of speech acoustic features, wherein the OOV word weight is inserted into the A2W word embeddings list relative to existing weights in the A2W word embeddings list.

2. The method of claim 1, wherein the AWE RNN is initially trained as an overall subnetwork using character sequences of In-Vocabulary (IV) words,
   wherein the initial training further involves an Acoustic Embedding Recurrent Neural Network (AE RNN) that receives an acoustic sequence correspondingly to each character sequence of an IV word used during training,
   wherein outputs of the AWE RNN and AE RNN are passed into a contrastive loss function, and
   wherein the AWE RNN and AWE→A2W NN are trained using a backpropagation algorithm to train weights of the AWE RNN, weights of the AE RNN, and weights of the AWE→A2W NN to minimize the contrastive loss function.

3. The method of claim 2, wherein, subsequent to the initial training of the overall subnetwork, the AE RNN is not used for normal operation of the ASR system and only the AWE RNN is used for a subsequent introduction of OOV words into the ASR system.

4. The method of claim 1, wherein the ASR system further comprises an Acoustic-to-Word Recurrent Neural Network (A2W RNN) that receives speech acoustic features as an input therein and an output of the A2W RNN is compared to embeddings of the A2W word embeddings listing using a dot product, and
   wherein, during a normal operation mode of the ASR system in which recognized words are output by the ASR system in response to speech acoustic features from an acoustic input into the ASR system, a word from the A2W word embeddings listing having a highest comparison result is provided as an output of the ASR system as a recognized word for the input speech acoustic features.

5. The method of claim 4, wherein an overall subnetwork including the A2W RNN is trained using In-Vocabulary (IV) words, wherein speech acoustic features of an IV word and a word sequence corresponding to that IV word are provided into a loss function, and wherein a backpropagation algorithm updates weights of the A2W RNN in order to minimize this loss function and to provide the A2W word embeddings listing.

6. The method of claim 1, as implemented in a cloud service.

7. A method for Automatic Speech Recognition (ASR), the method comprising:
   receiving a character sequence for an Out-of-Vocabulary (OOV) word into an Acoustic Word Embedding Recurrent Neural Network (AWE RNN) of an ASR system, as a mechanism to receive a character sequence for a new OOV word for the ASR system, the AWE RNN providing an Acoustic Word Embedding (AWE) vector as an output thereof;
   providing the AWE vector output from the AWE RNN as an input into an Acoustic Word Embedding-to-Acoustic-to-Word Neural Network (AWE→A2W NN) trained to provide an OOV word weight value from the AWE vector; and
   inserting the OOV word weight into a listing of Acoustic-to-Word (A2W) word embeddings used by the ASR system to output recognized words from an input of speech acoustic features, wherein the OOV word weight is inserted into the A2W word embeddings list relative to existing weights in the A2W word embeddings list.

8. The method of claim 7, wherein the AWE RNN is initially trained as an overall subnetwork using character sequences of In-Vocabulary (IV) words,
   wherein the initial training further involves an Acoustic Embedding Recurrent Neural Network (AE RNN) that receives an acoustic sequence correspondingly to each character sequence of an IV word used during training,
   wherein outputs of the AWE RNN and AE RNN are passed into a contrastive loss function, and
   wherein the AWE RNN and AWE→A2W NN are trained using a backpropagation algorithm to train weights of the AWE RNN, weights of the AE RNN, and weights of the AWE→A2W NN to minimize the contrastive loss function.

9. The method of claim 8, wherein, subsequent to the initial training of the overall subnetwork, the AE RNN is not used for normal operation of the ASR system and only the AWE RNN is used for a subsequent introduction of OOV words into the ASR system.

10. The method of claim 7, wherein the ASR system further comprises an Acoustic-to-Word Recurrent Neural Network (A2W RNN) that receives speech acoustic features as an input therein and an output of the A2W RNN is compared to embeddings of the A2W word embeddings listing using a dot product, and
    wherein, during a normal operation mode of the ASR system in which recognized words are output by the ASR system in response to speech acoustic features from an acoustic input into the ASR system, a word from the A2W word embeddings listing having a highest comparison result is provided as an output of the ASR system as a recognized word for the input speech acoustic features.

11. The method of claim 10, wherein an overall subnetwork including the A2W RNN is trained using In-Vocabulary (IV) words, wherein speech acoustic features of an IV word and a word sequence corresponding to that IV word are provided into a loss function, and wherein a backpropagation algorithm updates weights of the A2W RNN in order to minimize this loss function and to provide the A2W word embeddings listing.

12. The method of claim 7, as implemented in a cloud service.

13. A method for Automatic Speech Recognition (ASR), the method comprising:
    initially training an overall subnetwork comprising an Acoustic-to-Word Recurrent Neural Network (A2W RNN), the A2W RNN receiving In-Vocabulary (IV)

words for the initial training, the initial training using IV words resulting in a listing of Acoustic-to-Word (A2W) Word Embeddings stored in a memory of an ASR system performing the ASR processing;

receiving an Out-of-Vocabulary (OOV) word as a character sequence into an Acoustic Word Embedding Recurrent Neural Network (AWE RNN), as a mechanism to receive a character sequence for a new OOV word for the ASR system, the AWE RNN providing an Acoustic Word Embedding (AWE) vector as an output thereof;

providing the AWE vector output from the AWE RNN as an input into an Acoustic Word Embedding-to-Acoustic-to-Word Neural Network (AWE→A2W NN) trained to provide an OOV word weight value from the AWE vector; and inserting the OOV word weight into a listing of Acoustic-to-Word (A2W) word embeddings used by the ASR system to output recognized words from an input of speech acoustic features, wherein the OOV word weight is inserted into the A2W word embeddings list relative to existing weights in the A2W word embeddings list.

14. The method of claim 13, wherein the AWE RNN is initially trained as an overall subnetwork using character sequences of In-Vocabulary (IV) words,
wherein the initial training further involves an Acoustic Embedding Recurrent Neural Network (AE RNN) that receives an acoustic sequence correspondingly to each character sequence of an IV word used during training,
wherein outputs of the AWE RNN and AE RNN are passed into a contrastive loss function, and
wherein the AWE RNN and AWE→A2W NN are trained using a backpropagation algorithm to train weights of the AWE RNN, weights of the AE RNN, and weights of the AWE→A2W NN to minimize the contrastive loss function.

15. The method of claim 14, wherein, subsequent to the initial training of the overall subnetwork, the AE RNN is not used for normal operation of the ASR system and only the AWE RNN is used for a subsequent introduction of OOV words into the ASR system.

16. The method of claim 13, wherein the ASR system further comprises an Acoustic-to-Word Recurrent Neural Network (A2W RNN) that receives speech acoustic features as an input therein and an output of the A2W RNN is compared to embeddings of the A2W word embeddings listing using a dot product, and
wherein, during a normal operation mode of the ASR system in which recognized words are output by the ASR system in response to speech acoustic features from an acoustic input into the ASR system, a word from the A2W word embeddings listing having a highest comparison result is provided as an output of the ASR system as a recognized word for the input speech acoustic features.

17. The method of claim 16, wherein an overall subnetwork including the A2W RNN is trained using In-Vocabulary (IV) words, wherein speech acoustic features of an IV word and a word sequence corresponding to that IV word are provided into a loss function, and wherein a backpropagation algorithm updates weights of the A2W RNN in order to minimize this loss function and to provide the A2W word embeddings listing.

18. The method of claim 13, as implemented in a cloud service.

19. A method for training an Automatic Speech Recognition (ASR) system, the method comprising:
receiving an acoustic sequence for each In-Vocabulary (IV) word used to initially train the ASR system;
concurrently receiving a word sequence corresponding to each IV word; and
preparing a listing of Acoustic-to-Word (A2W) Word Embeddings of the IV words, wherein the initial training uses a discriminative loss function, the discriminative loss function forcing, for each IV word in the listing of A2W word embeddings, the acoustic embedding for that IV word to be close to its text embedding in the listing.

20. The method of claim 19, further comprising using a backpropagation algorithm to update weights of an Acoustic-to-Word Recurrent Neural Network (A2W RNN) that receives speech acoustic features of the acoustic sequence, wherein the weight updating minimizes this discriminative loss function during the training.

21. The method of claim 20, further comprising:
providing an input for entry of a character sequence of IV word into an Acoustic Word Embedding Recurrent Neural Network (AWE RNN);
providing the acoustic sequence for each IV word into an Acoustic Embedding Recurrent Neural Network (AE RNN);
providing outputs of the AWE RNN and the AE RNN into a contrastive loss function;
using a backpropagation algorithm and the contrastive loss function to train weights of the AWE RNN and weights of the AE RNN using IV words; and
using the trained AWE RNN for receiving character sequences of Out-of-Vocabulary (OOV) words as a user input for new OOV words into the ASR system to add OOV words to the A2W Word Embeddings listing.

22. The method of claim 21, wherein the AE RNN is not longer considered after the weights of the AWE RNN are trained, so that only outputs of the AWE RNN are considered for an entry of an OOV word.

23. The method of claim 19, further comprising:
providing an input for a user to input a character sequence for an Out-of-Vocabulary (OOV) word;
calculating an AWE vector for the OOV word;
determining a weight factor for the OOV word from the AWE vector; and
adding the OOV to the A2W Word Embeddings listing based on the determined weight factor.

24. An Automatic Speech Recognition (ASR) system, comprising:
a processor in a computer system; and
one or more memory devices accessible to the processor, wherein at least one memory of the at least one memory device of the one or more memory devices stores a set of machine-readable instructions to configure the computer system to function as the ASR system, the ASR system comprising
an Acoustics-to-Word Recurrent Neural Network (A2W RNN), as implemented by a processor on a computer system, the A2W RNN configured to receive speech acoustic features of words to be automatically recognized, the A2W RNN providing an acoustic embedding of the speech acoustic features of input words; and
an Acoustic-to-Word (A2W) Word Embeddings list storing a listing of recognized words,
wherein the ASR is configured to select a word from the A2W Word Embeddings list for output of the ASR as a recognized word by selecting a word from the A2W Word Embedding list that most closely matches an output acoustic embedding of the A2W RNN for input speech acoustic features, and wherein the ASR is initially trained by:
- receiving an acoustic sequence for each In-Vocabulary (IV) word used to initially train the ASR system;
- concurrently receiving a word sequence corresponding to each IV word; and
- preparing a listing of Acoustic-to-Word (A2W) word embeddings of the IV words, wherein the initial training uses a discriminative loss function, the discriminative loss function forcing, for each IV word in the listing of A2W word embeddings, the acoustic embedding for that IV word to be close to its text embedding in the listing.

25. The ASR system of claim 24, further comprising an Acoustic-Word-Embedding Neural Network (AWE NN) configured to receive a character sequence of an Out-of-Vocabulary (OOV) word, the AWE NN providing an AWE vector from the input character sequence, which permits a weight to be calculated by which the OOV word can be entered into the A2W Word Embeddings listing of the ASR relative to weights of other words in the listing.

* * * * *